Sept. 12, 1944.  W. E. HAMILTON  2,357,820
POPCORN MACHINE
Filed Oct. 23, 1941  3 Sheets-Sheet 1

Inventor
William E. Hamilton
by [signature]
his Attorneys

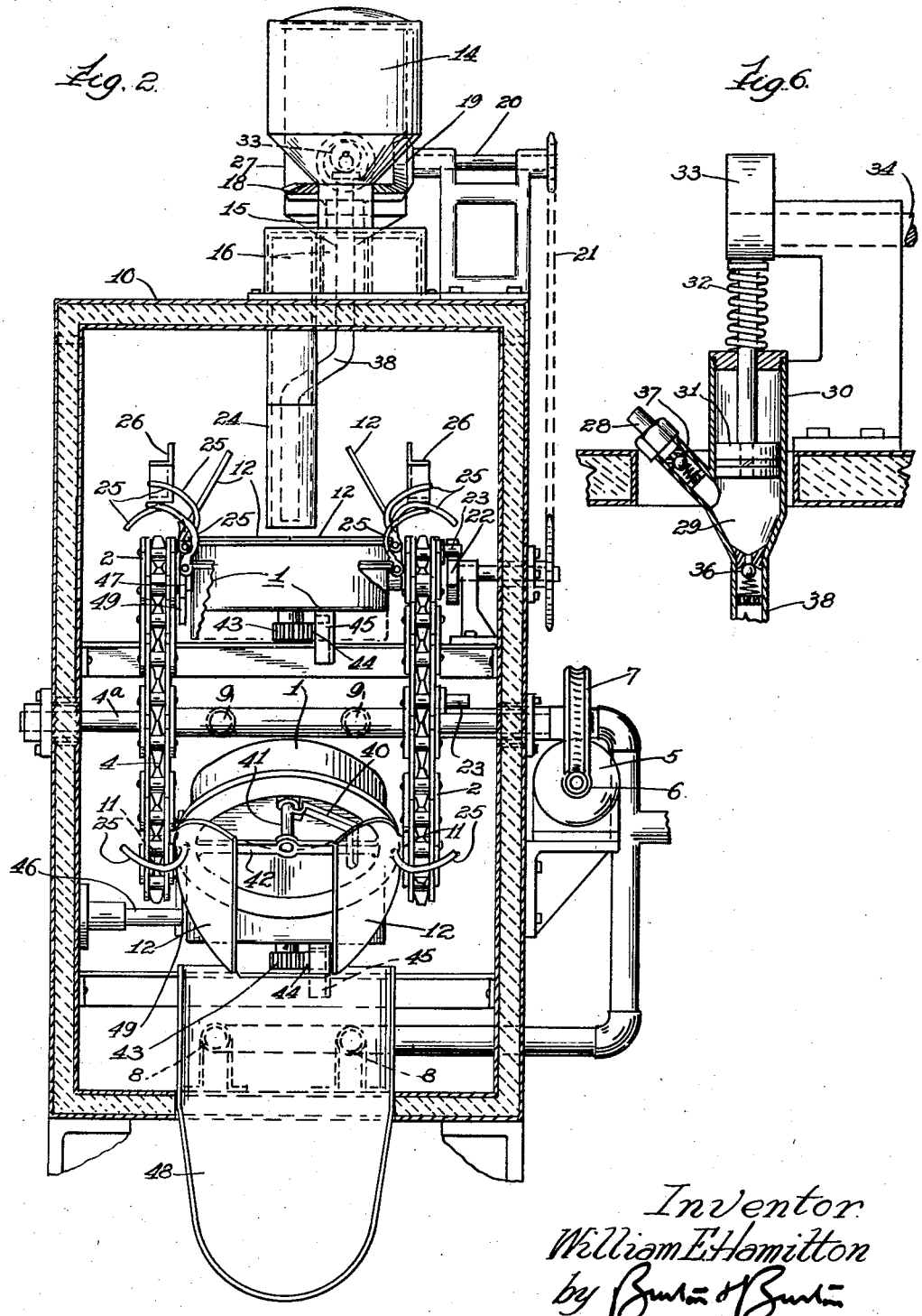

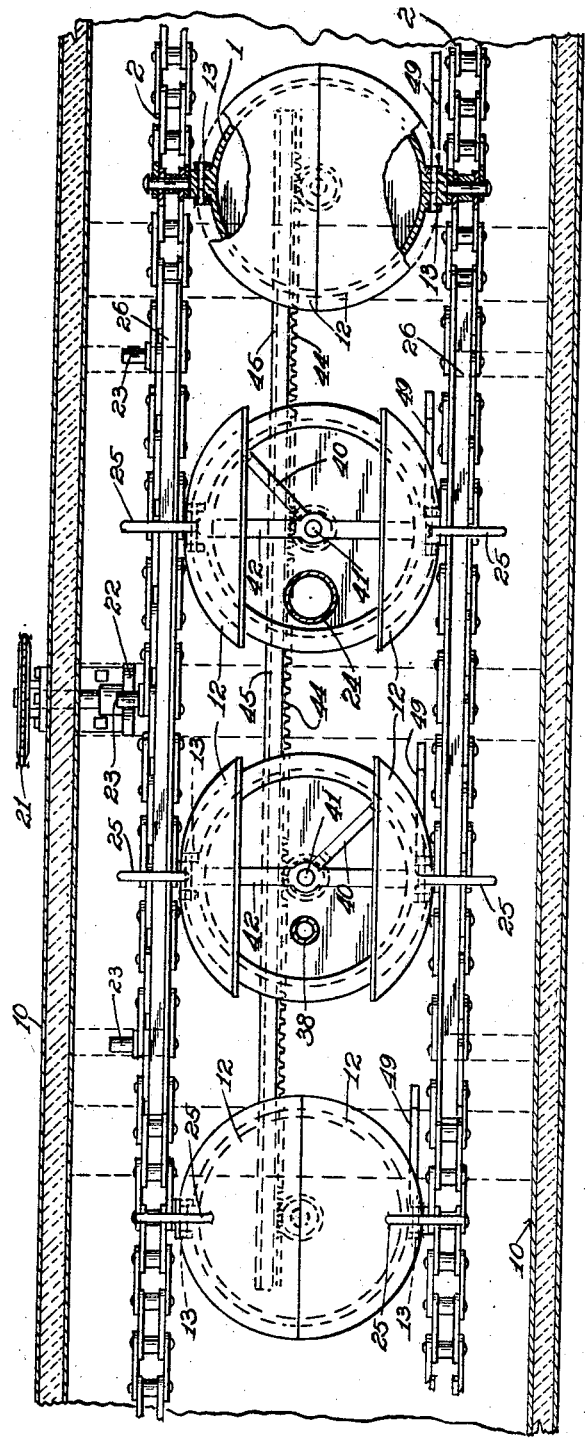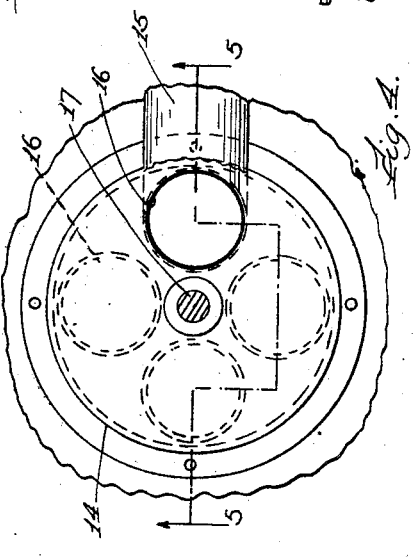

Patented Sept. 12, 1944

2,357,820

UNITED STATES PATENT OFFICE 2,357,820

POPCORN MACHINE

William E. Hamilton, Evanston, Ill., assignor to F. L. Klein Noodle Company, Chicago, Ill., a copartnership consisting of Lottie Klein and Bertram A. Klein Application October 23, 1941, Serial No. 416,245

9 Claims. (Cl. 99—238.5)

This invention relates to apparatus designed for producing popcorn on a commercial scale and as a substantially continuous process, and it is an object of the invention to provide a new and improved apparatus for this purpose.

Another object of the invention is to provide a machine which includes a plurality of pans for popping corn, said pans being arranged to travel in a continuous circuit in which they are subjected to heating means adapted to complete the popping of the corn in the time consumed by the pans in their travel adjacent such heating means.

Another object is to provide a continuously traveling conveyor of the endless type, supporting a plurality of pans at spaced positions along the conveyor and arranged to move the pans horizontally over adjacent heating means to effect the popping of corn therein, together with means for automatically emptying the pans at a predetermined point in their travel.

It is also an object of the invention to provide a continuously moving conveyor supporting a plurality of pans adapted for the popping of corn, together with heating means for effecting such treatment and means for automatically charging each pan with fresh corn at a certain point in its travel, such charging means being actuated by the travel of the conveyor and the pans carried thereby.

It is likewise an object of the invention to provide means by which each pan is supported pivotally on the conveyor and means for automatically inverting the pan by rotation about its pivotal support at a predetermined point in its travel, such means being actuated by the travel of the conveyor and serving to discharge the contents of the pan at the time when the popping operation has been completed.

Other objects and advantages of the invention will appear as the description proceeds.

In the drawings:

Figure 2 is a vertical sectional view taken substantially as indicated at line 2—2 on Figure 1 and on a somewhat larger scale.

Figure 3 is a horizontal plan section taken as indicated at line 3—3 on Figure 1.

Figure 4 is a detail plan section of the corn charging mechanism taken as indicated at line 4—4 on Figure 5.

Figure 5 is a staggered vertical section taken as indicated at line 5—5 on Figure 4.

Figure 6 is a detail section in a substantially vertical plane showing the oil charging device on an enlarged scale.

Figure 1:
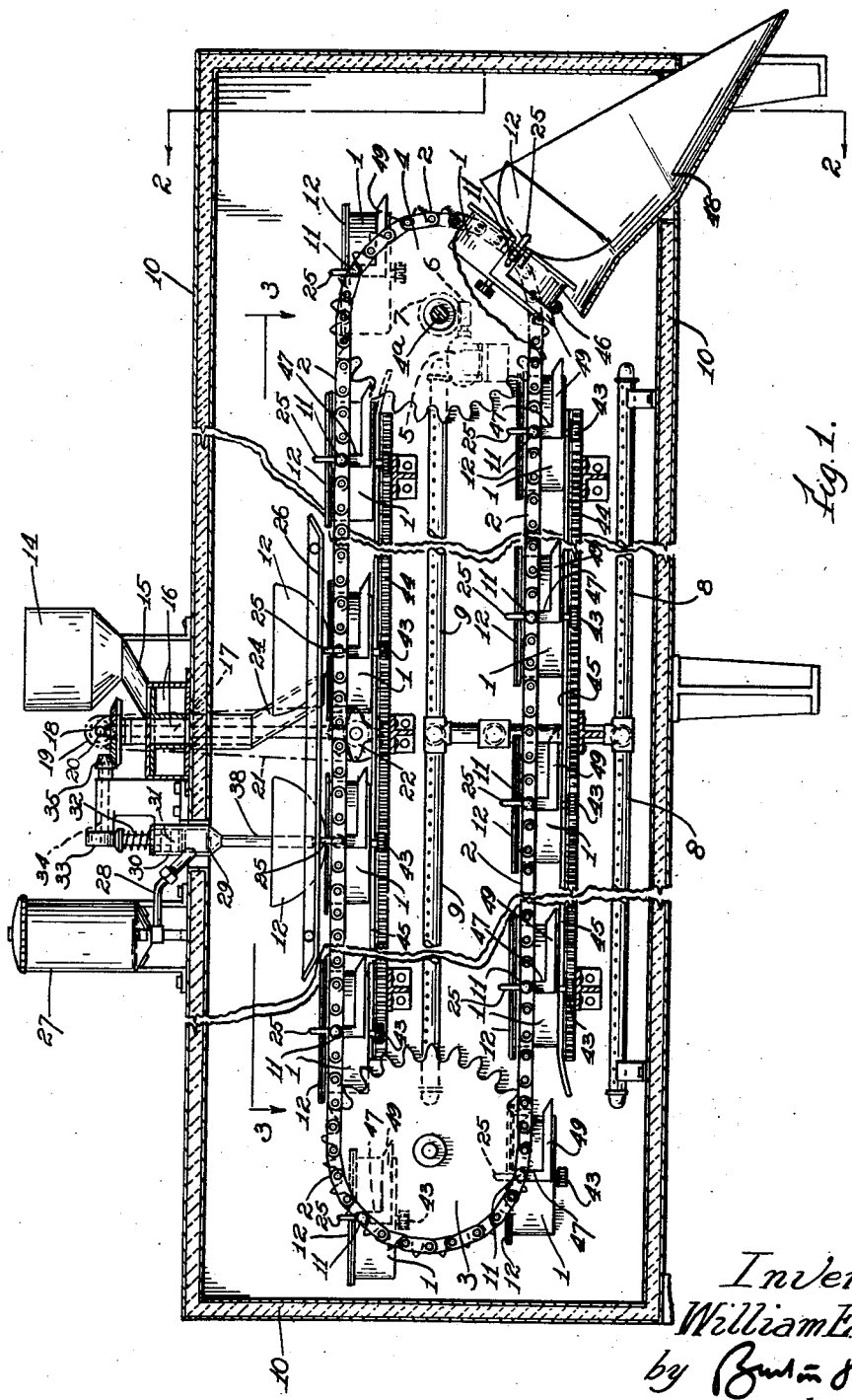
Figure 1 is a vertical sectional view of a chamber or enclosure with a conveyor and corn-popping apparatus mounted therein in accordance with this invention.

In the manufacture of popcorn it is possible, by experiment, to determine quite accurately the time which will be required for a vessel of given dimensions and material to produce a batch of finished popcorn when subjected to a given temperature. In my apparatus I provide a plurality of popping vessels or pans 1, carried at regular intervals on the chains 2, 2 of a traveling conveyor of the endless type in which the chains are trained about sprocket wheels shown at 3 and 4 in Figure 1. The conveyor thus provides a horizontally extending upper run and a horizontally extending lower run which may be of any desired length, and which the pans 1 will traverse at a definitely regulated speed, the conveyor being driven by any suitable means, such as a motor, indicated at 5 in Figure 2, having a worm 6 meshing with a worm gear 7 on the shaft 4ª of the sprocket wheels 4, 4. Thus, by any suitable speed controlling means (not shown) for the motor 5, the rate of rotation of the sprockets 4, 4 and the rate of travel of the chains 2, 2, may be regulated, as desired.

Extending under the horizontal run of the chains 2, 2 there is shown a heating element in the form of a gas burner 8, and, if required, a similar burner 9 may be mounted to extend under the upper run of the chains so that throughout most of their travel the pans 1 are subjected to the heat of the gas flames. And to improve the efficiency of the heating elements, the entire apparatus may be enclosed in a chamber 10, having heat insulating walls, as indicated in Figure 1, and provided with suitable vents (not shown) for the escape of the products of combustion.

Each of the pans 1 is shown as a relatively shallow, cylindrical vessel, pivotally carried by trunnions 11 which engage the chain 2; and each pan includes a pair of semi-circular covers 12, 12 which are hingedly connected to the pan at diametrically opposite portions of its rim, as indicated in dotted outline at 13 and also in section, in Fig. 3.

For supplying a definite charge of fresh corn to each pan as it travels along the upper run of the conveyor, there is mounted outside the chamber 10 a hopper 14 having a spout 15 which connects with one of four cylindrical chambers 16 mounted in a suitable carrier for rotation about the axis of the shaft 17. A bevel gear 18 on the shaft 17 meshes with a driving gear 19 on a horizontal shaft 20 which is connected by a suitable chain 21 and driving sprockets with a star wheel 22 disposed adjacent the path of one of the chains 2. Projecting from this chain, at intervals, are lugs 23, each of which engages the star wheel 22 and turns it through one-quarter of a revolution as the chain travels, thereby imparting motion to the shaft 17 sufficient to turn it through one-quarter of a turn so as to bring the cylinders 16 successively into registration with the spout 15. Each cylinder is thus filled with a measured quantity of corn from the hopper 14, and upon its rotation through the next quarter turn the cylinder 16 is registered with the discharge spout 24, terminating in position to deliver the corn into one of the pans 1.

To permit the filling of the pans the hinged covers 12 and provided with actuating arms 25, extending laterally over the chains 2, 2 and for a suitable distance adjacent the position of the spout 24, a pair of cam rails 26 extend in position to be encountered by the arms 25, as indicated in Figure 2, so that the lids or covers 12 are automatically raised and held open while the pans 1 are passing under the filling spout 24.

It is also desirable to supply a measured quantity of melted butter or oil for coating the bottom of the pan to facilitate the popping action and prevent burning the corn, and this is furnished from a supply tank 27 also mounted outside the chamber 10 and above it, as shown in Figure 1, with a discharge pipe 28 leading into a measuring chamber 29. As seen in Figure 6 the chamber 29 is formed at the lower end of a cylinder 30, having a piston 31 mounted for reciprocation therein and arranged to be driven in one direction by a spring 32, and in an opposite direction by an eccentric 33 on a shaft 34. The shaft 34 is connected by a bevel pinion 35 to the bevel gear 18, which operates the corn measuring device; hence, each quarter turn of the gear 18 produces one revolution of the eccentric 33 and actuates the piston 31 through one reciprocation. This serves to expel from the chamber 29 the quantity of oil accumulated therein, such expulsion being accomplished in opposition to a check valve 36 which prevents flow from the chamber 29 except under the force of the piston 31. Upon the return stroke of the piston a fresh quantity of oil is drawn into the chamber 29 by suction past the check valve 37 arranged in the supply line 28.

A delivery pipe 38, extending from the chamber 29, leads to a position for discharge into one of the pans 1, which may be the pan just ahead of that which is being filled with corn through the spout 24, or the pan just following it; or, if desired, the pipe 38 may be directed so as to lead into the same pan as the spout 24, thus providing oil and corn simultaneously to prepare for the popping operation. Since the pans are kept continuously hot, the popping process begins immediately and continues as the pans travel through the remainder of the upper run of the conveyor, thence around the sprocket wheels 3 and along the lower run, as indicated in Figure 1.

In accordance with the usual practice, each pan is provided with a stirring device to prevent the corn from sticking or burning onto the bottom of the pan. Each device may consist of a radially extending arm, as seen in Figure 2, attached to a central shaft 41 within the pan 1, the upper end of the shaft being journaled in a cross-arm 42 and the lower end extending through the bottom of the pan and carrying a drive pinion 43 at its lower end. As the pans 1 travel horizontally, the pinions 43 mesh with a straight rack 44 which extends under the pans and is supported on one side of the guide rail 45 with which the bottoms of the pans engage as they travel, and which prevents them from tilting in response to the slight torque involved in rotating the gears 43 and stirring devices 40 attached thereto. The racks 44 and guide rails 45 are associated with both the upper and lower runs of the conveyor chains 2.

When the pans 1 have traveled from the filling spout 24, around the sprockets 3, and through the length of the lower horizontal run of the conveyor, the popping operation will be completed— the timing of the travel of the conveyor chains being so regulated as to insure this result. Then, as each of the pans 1 arrives adjacent the sprocket wheel 4, a fixed trip lug 46 encounters a lateral projection 47 on the side of the pan at a point below its trunnion 11 so as to tip the pan over forwardly as it continues to travel, and thus discharge its contents into a delivery chute 48 which may be arranged to lead outside the heat insulated chamber 10. As the pan 1 is inverted, its covers 12 swing open by gravity so as to release the load, and the pan is held in this position for a sufficient period by means of a trailing cam arm 49 which is shown extending at right angles to the trip-engaging surface 47, and which rides over the upper surface of the trip lug 46 as the pan travels upwardly around the sprocket 4. Figures 1 and 2 show one of the pans 1 in tilted discharging position, with the covers swung open by gravity, as described. It may be understood that the covers are relatively light, and that their hinges may be designed to check their opening movements at inclined positions, as shown in the drawings, so that as the pan approaches the upper portion of the sprocket 4 in its travel, the center of gravity of the pan itself, being below the axis of the trunnions 11, will cause it to right itself automatically, and the covers 12 will drop to closed position. Since the pan is then empty, it is desirable that the filling mechanism for supplying corn and oil thereto be located fairly near the sprocket wheels 4, but if it is found that the temperature of the pans drops considerably as they traverse the wheels 4, 4 the filling devices may be located far enough back from said wheels to allow time for reheating the pans by limited travel thereof over the initial portion of the heating element 9. This completes the cycle of operation, which is repeated continuously for any desired period of time. It will be understood that any means (not shown) may be provided for shutting off the supply of corn from the hopper 14 and of oil from the tank 27, so that upon shutting down the machine these supplies will first be cut off and the conveyor chains will then be operated only long enough to continue the processing of material then in the pans 1 and to effect discharge thereof through the chute 48.

I claim as my invention:

1. A popcorn machine which includes a traveling conveyor having a horizontal run, a plurality of popcorn pans carried by the conveyor, fixedly mounted heating means extending below and adjacent the path of the pans as they traverse said horizontal run, and a stirring device in each pan with actuating means therefor extending outside the pan and operable by the travel thereof.

2. A popcorn machine which includes a traveling conveyor having a horizontal run, a plurality of popcorn pans carried by the conveyor, fixedly mounted heating means extending below and adjacent the path of the pans as they traverse said horizontal run, and a rotary stirring device journaled in each pan with an operating shaft therefor extending outside the pan, a gear on said shaft and a toothed rack disposed adjacent the path of travel of the pans in position to mesh with the gears and actuate the stirring devices as the pans travel.

3. A popcorn machine which includes a traveling conveyor having a horizontal run, a plurality of popcorn pans carried by the conveyor, fixedly mounted heating means extending below and adjacent the path of the pans as they traverse said horizontal run, a lid hinged to each pan, and means actuated by the travel of the pan to open the lid.

4. A popcorn machine which includes a traveling conveyor having a horizontal run, a plurality of popcorn pans carried on horizontal trunnions by the conveyor, fixedly mounted heating means extending below and adjacent the path of the pans as they traverse said horizontal run, means actuated by the travel of the pans to turn them on their trunnions and dump their contents, and a lid hingedly attached to each pan normally closed when the pan is in upright position and opening by gravity when the pan is tilted to dumping position.

5. A popcorn machine which includes a traveling conveyor having a horizontal run, a plurality of popcorn pans carried by the conveyor, fixedly mounted heating means extending below and adjacent the path of the pans as they traverse said horizontal run, a lid hingedly attached to each pan with an actuating arm extending therefrom, and a fixed cam rail extending adjacent the path of travel of the pans and formed to engage said actuating arms and swing the lids to open position for a predetermined portion of their travel.

6. A popcorn machine which includes a traveling conveyor having a horizontal run, a plurality of popcorn pans carried by the conveyor, and fixedly mounted heating means extending below and adjacent the path of the pans as they traverse said horizontal run, together with an oil supply receptacle, and means actuated by the travel of the conveyor operable to deliver a charge of oil to each pan as it passes a predetermined point in its travel.

7. A popcorn machine which includes a traveling conveyor having a horizontal run, a plurality of popcorn pans carried by the conveyor, fixedly mounted heating means extending below and adjacent the path of the pans as they traverse said horizontal run, a lid hinged to each pan, and means actuated by the travel of the pan to open the lid, together with a filling mechanism including a measuring chamber and means actuated by the travel of the conveyor to release the contents of said chamber into a pan momentarily registered therewith.

8. A popcorn machine which includes a plurality of separate popcorn pans and means by which they are carried on horizontal pivots in a substantially horizontal path, fixedly mounted heating means extending below and adjacent said path of said pans, means actuated by the travel of the pans to turn them on their pivots and dump their contents, and a lid hingedly attached to each pan normally closed when the pan is in upright position and opening by gravity when the pan is tilted to dumping position.

9. A popcorn machine which includes a plurality of separate popcorn pans and means by which they are carried in a substantially horizontal path, fixedly mounted heating means extending below and adjacent said path of said pans, a lid hingedly attached to each pan and means actuated automatically in timed relation to the travel of the pans to swing the lids to open position at a predetermined point in their travel.

WILLIAM E. HAMILTON.